United States Patent [19]

Hinkle

[11] Patent Number: 5,396,215

[45] Date of Patent: Mar. 7, 1995

[54] VEHICLE OPERATION INHIBITOR CONTROL APPARATUS

[76] Inventor: Terry A. Hinkle, 14392 Dresden, Sterling Heights, Mich. 48312

[21] Appl. No.: 967,990

[22] Filed: Oct. 28, 1992

[51] Int. Cl.$^6$ ............................................. B60R 25/10
[52] U.S. Cl. ..................... 340/426; 340/539; 340/425.5; 340/573; 340/576; 307/10.2; 307/10.3
[58] Field of Search ............... 340/426, 576, 539, 573, 340/542, 425.5; 307/9.1, 10.1, 10.2, 10.3, 10.6

[56] References Cited

U.S. PATENT DOCUMENTS

| | | | |
|---|---|---|---|
| 3,082,414 | 3/1963 | Papaminas | 340/279 |
| 3,755,776 | 9/1973 | Kotras | 340/53 |
| 3,796,210 | 3/1974 | Hoeg | 128/2 C |
| 4,023,138 | 5/1977 | Ballin | 340/539 |
| 4,063,410 | 12/1977 | Welling | 340/573 |
| 4,142,601 | 3/1979 | Ochiai | 180/99 |
| 4,361,834 | 11/1982 | King | 340/575 |
| 4,607,719 | 8/1986 | Rugis et al. | 180/272 |
| 4,613,845 | 9/1986 | Du Bois | 340/52 R |
| 4,645,939 | 2/1987 | Robinson | 307/10 AT |
| 4,682,155 | 7/1987 | Shirley | 340/573 |
| 4,723,625 | 2/1988 | Komlos | 180/272 |
| 4,736,196 | 4/1988 | McMahon et al. | 340/573 |
| 4,777,477 | 10/1988 | Watson | 340/573 |
| 4,843,377 | 6/1989 | Fuller et al. | 340/573 |
| 4,885,571 | 12/1989 | Pauley et al. | 340/573 |
| 4,918,432 | 4/1990 | Pauley et al. | 340/573 |
| 4,952,913 | 8/1990 | Pauley et al. | 340/573 |
| 4,999,613 | 3/1991 | Williamson et al. | 340/573 |
| 5,032,823 | 7/1991 | Bower et al. | 340/568 |

Primary Examiner—Donnie L. Crosland
Attorney, Agent, or Firm—Basile and Hanlon

[57] ABSTRACT

A band housing a transmitter is non-removably mounted about a portion of the body of a person who is not authorized to operate a motor vehicle. A receiver is mounted in the vehicle in close proximity to the vehicle steering wheel to detect signals from the transmitter when the person wearing the band is situated in proximity with the steering wheel. Upon receiving a signal from the transmitter, the receiver generates an output signal to electric circuit control elements which inhibit the operation of the vehicle. The circuit elements include a relay whose switchable contact is connected between the vehicle battery and the ignition coil. Alternately, the contact of the relay is connected to a solenoid which activates a steering or ignition lock mechanism. A detector may be provided in combination with the transmitter and the receiver to detect movement of the vehicle steering wheel or contact of the wearer of the band with the steering wheel. A clock is mounted in the receiver to track total time of use of the band, which time is viewable on a display mounted within the band. An electrical conductor extends between a battery mounted within the band, the clock and electrical contacts mounted on overlapping ends of the band to detect tampering and/or removal of the band by disconnecting the timer from the battery.

9 Claims, 2 Drawing Sheets

VEHICLE OPERATION INHIBITOR CONTROL APPARATUS

BACKGROUND OF THE INVENTION

1. Field of the Invention

The present invention relates, in general, to motor vehicles and, more specifically, to control apparatus for inhibiting or preventing the operation of motor vehicles by unauthorized persons.

2. Description of the Art

People convicted of numerous vehicle moving violations or drunk driving charges frequently have their driver's license revoked or suspended for a predetermined time, i.e., from several months up to one or more years. However, it is known that some of these people still continue to operate a motor vehicle, even without a driver's license, and thereby pose a continued threat to the safety of other drivers. What is needed is an apparatus which prevents a person whose driver's license has been revoked or suspended from operating a motor vehicle.

Various safety devices have been developed to prevent an intoxicated driver from operating a motor vehicle. Such devices use a breathalizer which indirectly measures the blood/alcohol content of the potential driver and will inhibit the starting or operation of the vehicle if the potential driver's blood/alcohol content exceeds a predetermined safe level. Related devices employ various tests, such as the input of a code through a keypad, to insure that the driver is capable of safely operating a motor vehicle. However, a person who is not intoxicated, but whose driver's license has been revoked or suspended, is quite capable of passing such tests in order to operate a vehicle.

Thus, it would be desirable to provide an apparatus which prevents a person whose driver's license has been revoked or suspended from operating a motor vehicle. It would also be desirable to provide such an apparatus which can be easily used in all automobiles and is automatic in operation.

SUMMARY OF THE INVENTION

The present invention is an apparatus which inhibits the operation of a vehicle by an unauthorized person, such as one whose driver's license has been revoked or suspended.

The vehicle operation inhibitor control apparatus of the present invention includes a band or strap which is non-removably mounted around a portion of the body of a person who is not authorized to operate a motor vehicle. A transmitter means is mounted within the band for transmitting a signal indicative of the location of the band. A receiver means is mountable in the vehicle, preferably, in close proximity to the vehicle steering wheel, and is responsive to the signal from the transmitter means, for generating an output signal when the band and the transmitter means are located within a predetermined distance from the receiver means, such as would occur when the unauthorized person is seated in the driver's seat of a motor vehicle. A control means is mounted in the vehicle and is responsive to the output signal from the receiver means for inhibiting or preventing the operation of the vehicle.

In one embodiment, the control means includes means for locking the steering wheel and/or the ignition switch of the vehicle thereby preventing operation or starting of the vehicle. In another embodiment, the control means includes a switch means, responsive to the output signal from the receiver means, which is connected to the vehicle ignition circuit for disconnecting the ignition circuit from the vehicle battery to thereby prevent initial or further operation of the vehicle.

In another embodiment, detector means are mounted on the steering wheel of the vehicle to detect either movement of the steering wheel or contact of the unauthorized person's hands with the steering wheel. The generation of a signal by the detection means, in conjunction with an output signal from the receiver means indicating that the unauthorized person is seated in the driver's seat, will activate the control means to inhibit the operation of the vehicle. The detector means may comprise a motion sensor mounted on the steering wheel or an electrical contact which is closed by contact of the unauthorized person's hands with the steering wheel.

In another embodiment, means are mounted in the band for indicating tampering with or unauthorized attempts to remove the band. The tampering means includes electrical circuit elements which are mounted in the band and extend along the entire length of the band to provide an electrical current path between a battery and a clock means mounted within the band. Stretching of the band or severing the band will break the circuit elements thereby disconnecting the clock from the battery. A display is driven with the clock to display the total time of use of the band. Discontinuance of power to the clock will stop the clock output and thereby hold the display at the specific time that tampering occurred.

The present invention uniquely provides an apparatus which prevents an unauthorized person, i.e., one whose driver's license has been revoked or suspended, from operating a motor vehicle. The apparatus is easily installed in motor vehicles and is automatic in operation. Further, the apparatus includes tampering means to indicate any attempt to tamper with the non-removable band used in the present apparatus.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
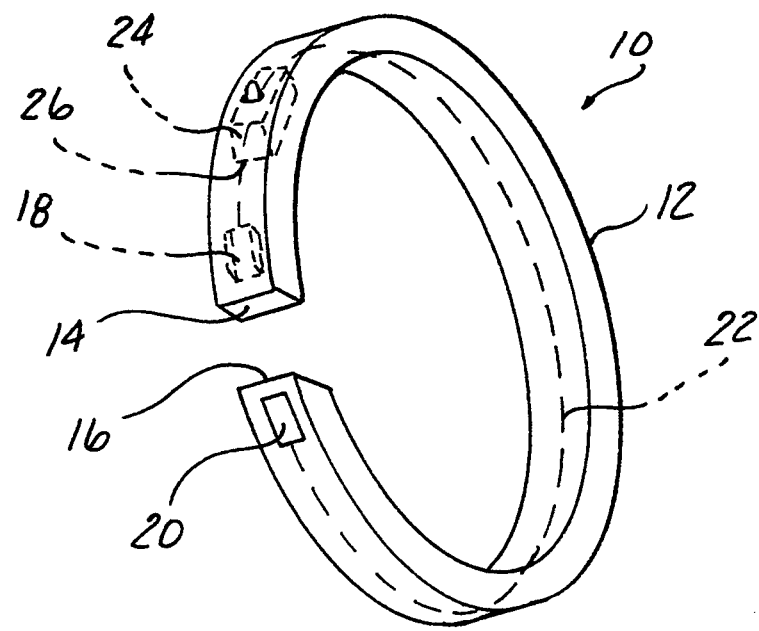
FIG. 1 is a perspective view of a non-removable band forming a part of the present invention.

Referring now to the drawing, there is depicted an apparatus for preventing the operation of a motor vehicle by an unauthorized person, such as a person whose driver's license has been revoked or suspended.

As shown in FIG. 1, the present apparatus includes a band 10 which is adapted to be non-removably mounted about a portion of the body of a person who is not authorized to operate a motor vehicle. The band 10 may be sized to be removably mounted around the wrist, ankle or any other portion of the body of such a person.

As shown in FIG. 1, the band 10 is in the form of an elongated strap 12 which is formed of any suitable flexible material, such as nylon, other suitable plastics, leather, cloth, etc. The band 10 has first and second opposed ends 14 and 16. The first and second ends 14 and 16 are designed to overlap each other when the band 10 is mounted about the portion of the body of a person and be non-removably secured together. Preferably, the first and second ends 14 and 16 are non-removably joined by means of an adhesive. Other joining means, such as lockable buckles may also be used to non-removably attach the band 10 onto a person. The band 10 can be removed by an authorized person by means of severing the band at any portion.

The band 10 is provided with anti-tampering means in the form of first and second electrical contacts 18 and 20, respectively, which are mounted in the first and second ends 14 and 16, respectively, of the band 10 and positioned to contact each other when the first and second ends 14 and 16 of the band are overlapped and joined together. An electrical conductor 22 extends between the first and second electrical contacts 18 and 20 and electric circuit elements mounted within an interior cavity 24 in the band 10. The first and second electrical contacts 18 and 20 and the electrical conductor 22 are devised, as described in greater detail hereafter, to provide an electrically conductive path between a battery mounted within the interior cavity 24 in the band 10 and the circuit elements of the present apparatus such that any break in the electrical conductor 22 or a separation of the first and second electrical contacts 18 and 20, such as will occur during any attempt to remove the band 10 from the wrist or ankle of the wearer, will cause power from the battery to be discontinued thereby rendering further operation of the present apparatus inactive.

The interior cavity 24 is formed at any suitable location within the interior of the band 10. A flap or cover 26 covers the interior cavity 24 and is designed to be sealingly attached to the remainder of the strap 12 by means of an adhesive, etc.

Figure 2:
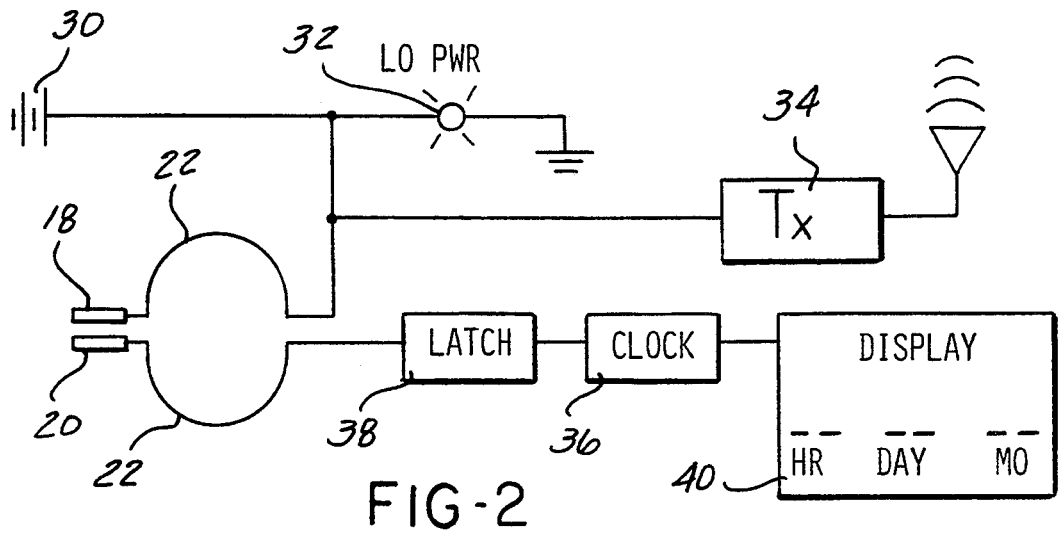
FIG. 2 is a schematic diagram of the circuitry mounted in the band shown in FIG. 1.

As shown in FIG. 2, the circuit elements mounted within the interior cavity 24 in the band 10 include a suitable electric power source, such as a battery 30. Any suitable battery or batteries may be employed in the present apparatus. Preferably, thin disc-shaped batteries are employed due to their small size. The power requirements of the battery 30 are selected to provide any predetermined length of use of the band 10, such as from one to twelve months, for example only.

A low power indicator 32 is connected to the battery 30 and projects through the strap 12 forming the band 10 so as to be visible exteriorly of the band 10 as shown in FIG. 1. Any suitable indicator 32 may be employed, such as an LED or a hall-effect indicator which latchably switches state upon the detection of a low battery power level. The indicator 32 will switch states, or not be illuminated in the case of an LED, when the remaining power level of the battery 30 drops below a predetermined level necessary for proper operation of the apparatus.

A transmitter means 34, FIG. 2, is also mounted in the interior cavity 24 and is connected to the battery 30. Transmitter means 34 may be any suitable transmitter capable of transmitting a signal over a prescribed distance. Preferably, an RF transmitter is employed, such as those commonly used in garage door openers, vehicle security systems, vehicle remote door lock control apparatus, etc.

The transmitter 34 may provide periodic or continuous radio frequency signals. Periodic signals will extend the life of the battery 30 and may be provided at a predetermined time interval, such as every ten seconds, twenty seconds, etc.

Also mounted in the interior cavity 24 of the band 10 is a clock 36 which is connected by the electrical conductor 22 and the contacts 18 and 20 to the battery 30. A latch circuit 38 is connected in series with the clock 36 and the conductor 22 as shown in FIG. 2. In operation, the latch 38, which may comprise a conventional flip-flop, will normally be in a state to allow electrical current to flow from the battery 30 to the clock 36 as long as the contacts 18 and 20 are joined together and the conductor 22 continuously extends through the band 10 without any breaks or separations therein.

The clock 36, after being initially connected to the battery 30, will provide clock pulses which are used to determine the total time of use of the band 10. The clock pulses are input to a display 40 also mounted in the interior cavity 24 in the band 10. The display 40 which may be a liquid crystal display (LCD), for example, provides various time of use information, such as hours, days and months, for example only. The display 40 is normally completely contained within the interior cavity 24 and is not visible exteriorly of the band 12.

In the event that the electrical conductor 22 is broken or the first and second electrical contacts 18 and 20 separated, such as by an unauthorized attempt to remove the band 10 from the wrist or ankle of the wearer, power will be disconnected from the clock 36 thereby stopping the further input of clock pulses to the display 40. The display 40, which has its own internal battery backup, will retain the accumulated time information. This enables supervisory personnel to determine the exact time of tampering with the band 10. Re-connection of power from the battery 30 to the clock 36 will not provide further time information due to the latch 38 which will have switched to an opposite state upon the first disconnection of power from the battery 30 and will remain in such state until reset by an authorized supervisory personnel.

Figure 3:
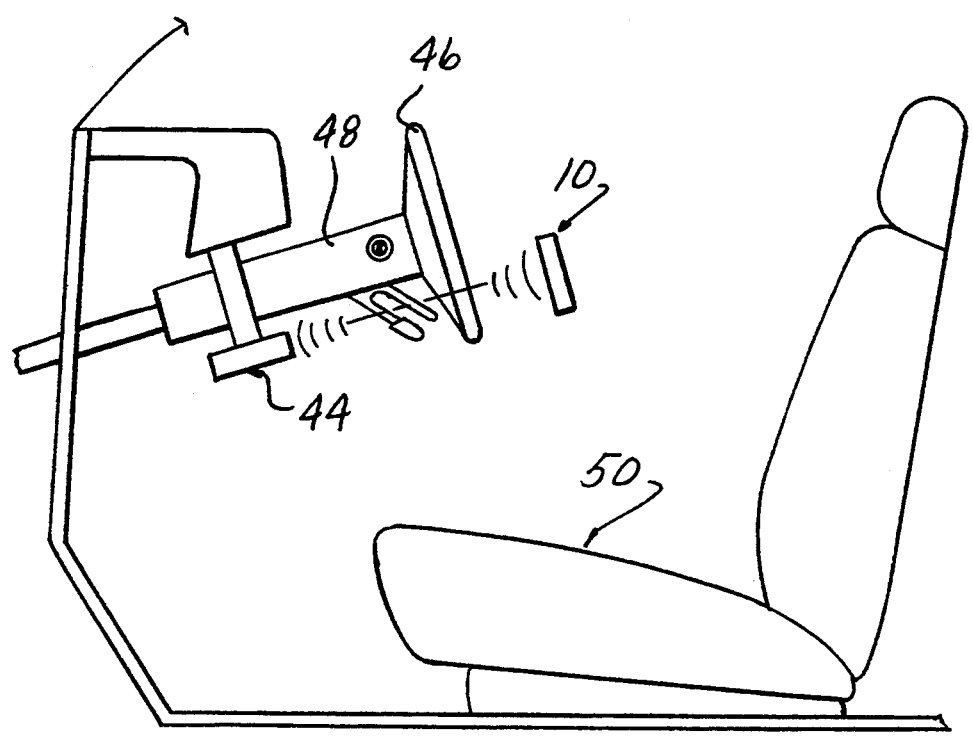
FIG. 3 is a pictorial representation of the apparatus of the present invention in normal operation in a motor vehicle.
Figure 4:
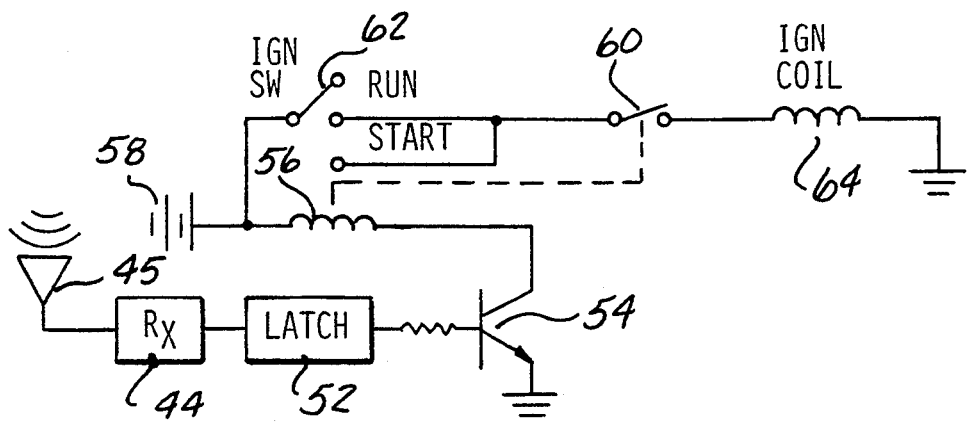
FIG. 4 is a schematic representation of one embodiment of the control means of the present invention.

Referring now to FIGS. 3 and 4, the present apparatus also includes a receiver means 44 which is disposed in a housing mountable within the passenger compartment of a motor vehicle, preferably in close proximity to the steering wheel 46 of a motor vehicle. By way of example only, the receiver means 44 is attachable to the vehicle steering column 48 or under the dashboard of the vehicle. The power capabilities of the receiver 44, such as the length of its antenna, not shown, are selected to detect an output signal from the transmitter means 34 within a prescribed, small range or distance, such as from two to three feet, so as to detect a person wearing the band 10 being seated in the driver's seat 50 of a motor vehicle.

The receiver means 44 may be any suitable RF frequency receiver, such as those commonly employed in garage door openers, vehicle security systems, etc. Due to the small detection range of the receiver 44, unique codes for each receiver 44-transmitter 34 pair are not necessary. However, such coded signals as is common in garage door openers, vehicle security systems, etc., may be employed to provide a unique radio frequency coded signal for each device used by a different person who is not authorized to operate a motor vehicle.

The receiver means 44 generates an output signal upon receiving a signal from the transmitter means 34. The output signal is input to a control means which, upon receiving an output signal from the receiver means 44 inhibits operation of the motor vehicle as described hereafter. According to the present invention, "inhibit" or "prevent" is meant to include preventing the starting of the motor vehicle engine, stopping the operation of the engine if it is already running or retarding normal operation of the vehicle by preventing turning of the steering wheel, for example.

As shown in FIG. 4, the output signal from the receiver means 44 is input to a latch circuit 52 which, when triggered, drives a transistor 54 into a conductive state. When in a conductive state, the transistor 54 connects a relay coil 56, which is also connected to the vehicle battery 58, to ground thereby allowing current to flow through the coil 56. Such current flow, as is conventionally known, will cause a switchable contact 60 associated with the relay coil 56 to switch states from the normally closed state shown in FIG. 4 to a normally open state.

The switchable contact 60 is connected, in one embodiment of the present invention shown in FIG. 4, in the vehicle ignition/starter circuit between the vehicle ignition switch 62 and the ignition coil 64. With the contact 60 in its normally closed position, the vehicle ignition switch 62 may be employed in a normal manner to start the engine of the vehicle. However, when an unauthorized person wearing the band 10 attempts to operate the vehicle, the transmitter 34 will transmit a signal which will be received by the receiver 44. The receiver 44 will generate an output signal which will activate the relay 56, as described above, such that the contact 60 of the relay 56 switches to an open state thereby opening the circuit between the vehicle battery 58 and the ignition coil 64 to prevent the starting of the engine of the vehicle.

In another embodiment, which is a modification of the circuit shown in FIG. 4, the relay 56 and a normally open switchable contact 66 may be employed to activate a solenoid 68 which controls a locking device to lock the vehicle ignition switch or the steering wheel in a fixed position to inhibit operation of the vehicle.

In this embodiment of the present invention, it is possible that the person wearing the band 10 may be in the front passenger seat or rear seat of the vehicle and may inadvertently reach into proximity with the driver's seat 50, such as by reaching toward a cigarette lighter, radio, ventilation control switch, etc. Such movement may bring the transmitter 34 into proximity with the receiver 44 and generate the output signal to activate the relay 56 as described above. This creates a potentially hazardous situation if the vehicle in which the apparatus of the present invention is mounted is being operated by an authorized person and currently moving. To prevent the sudden stoppage of the vehicle engine or locking of the vehicle steering wheel in a fixed position, the apparatus of the present invention may be provided with a timer which sets a predetermined time period, such as ten to thirty seconds, and a warning light or buzzer to indicate that the apparatus has been activated and, at the end of the time period, will take control action to discontinue operation of the vehicle. This will provide a sufficient time for the operator of the vehicle to take corrective action. Alternately, the control means, by use of a vehicle speed sensor, can operate to kill the engine or lock the steering wheel in a fixed position upon the next stoppage or slowing down of the vehicle.

In another embodiment of the present invention, means are provided for detecting the actual contact of an unauthorized person using the apparatus of the present invention with the steering wheel 46 of a vehicle. Such means may comprise one of a steering wheel motion detector means or a steering wheel contact means.

Figure 5:
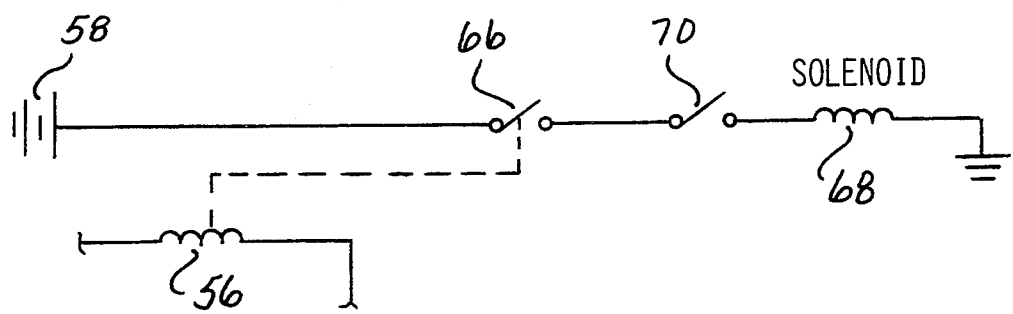
FIG. 5 is a schematic diagram of another embodiment of the control means of the present invention.

A suitable motion detector switch 66, as shown in FIG. 5, may be mounted in series with the vehicle battery 58 and the solenoid coil 68 or, alternately, the vehicle ignition coil 64. The motion detector 66 may comprise any suitable motion detector, such as a mercury reed switch mounted on the steering wheel 46, which generates an output signal upon any movement or rotation of the steering wheel 46. When such movement is detected, the motion detector switch 66 will close. At the same time, the receiver 44 will have generated an output signal since it will have received a signal from the transmitter 34. The output signal from the receiver 44 will activate the relay 56 and cause the normally open contact 66 of the relay 56 to likewise close thereby completing a series path between the vehicle battery 58 and the solenoid coil 68 to activate the solenoid coil 68. The solenoid coil 68 may be employed in a conventional vehicle ignition lock mechanism or steering wheel lock mechanism to prevent movement of the ignition switch to a run or start position or to prevent further rotation of the vehicle steering wheel 46.

The motion detector switch 66 may also comprise a physical contact switch mounted on the steering wheel 46. Such a contact may comprise a movable conductive member extending around at least a portion and preferably the entire circumference of the steering wheel 46 so as to be contacted and moved to a closed state when an unauthorized person wearing the apparatus of the present invention places his or her hands on the steering wheel 46 in an attempt to operate the motor vehicle. The contact 66 will close in the same manner as described above to connect power from the vehicle battery 58 to the solenoid coil 68. In addition to a movable contact, a proximity sensor, a capacitive discharge switch, etc., may also be employed to detect contact of or at least the close proximity of an unauthorized person's hands with the steering wheel 46.

In summary, there has been disclosed a unique apparatus which prevents an unauthorized person from operating a motor vehicle. The present apparatus is easy to install in all vehicles and automatically prevents operation of the motor vehicle when an unauthorized person attempts to operate the motor vehicle.

What is claimed is:

1. An apparatus for preventing operation of a motor vehicle by an unauthorized person comprising:

a band mountable around a portion of the body of an unauthorized person;

transmitter means, mounted in the band, for transmitting a signal over a predetermined distance;

receiver means, mountable in proximity with a steering wheel of a vehicle for receiving the signal from the transmitter means when the transmitting means is within the predetermined distance from the receiver means, the receiver means generating an output signal indicative of the proximity of the band and the transmitter means within the predetermined distance of the receiver means; and control means, mounted in the vehicle and responsive to the output signal from the receiver means, for inhibiting operation of the vehicle upon the generation of an output signal from the receiver means.

2. The apparatus of claim 1 wherein the control means comprises:

means for locking the steering wheel from rotation.

3. The apparatus of claim 1 wherein the control means comprises:

switch means, responsive to the output signal from the receiver means and connected in a vehicle ignition circuit, for disconnecting the vehicle ignition circuit from a vehicle battery, when the switch means is activated.

4. The apparatus of claim 1 further comprising:

means, mounted on a steering wheel of a vehicle, for detecting contact of an unauthorized person with the steering wheel, the contact detecting means generating an output signal upon detecting such contact; and the control means also being responsive to the means for detecting contact with a steering wheel of a vehicle for inhibiting operation of the vehicle only upon generation of both of the output signal from receiver means and the output signal from the means for detecting contact.

5. The apparatus of claim 4 wherein the detecting means comprises:

a motion detector, mounted on a steering wheel of a vehicle, for detecting rotation of a steering wheel.

6. The apparatus of claim 4 wherein the detecting means comprises:

electrical contact means, mounted on a steering wheel of a vehicle, for detecting contact of an unauthorized person with the steering wheel;

the contact means being connected to means for operating the vehicle to render, when activated, the means for operating the vehicle inoperative.

7. The apparatus of claim 1 further comprising:

means, mounted in the band, for indicating tampering with the band, the tampering indicating means comprising:

a battery mounted in the band;

clock means, mounted in the band and connected to the battery, for generating clock signals indicative of the continuous time of use of the band; and electric circuit elements, mounted in the housing and normally providing a continuous electrical circuit path between the battery and the clock means, the circuit elements, when opened, disconnecting the clock means from the battery.

8. The apparatus of claim 7 further including:

display means, mounted in the band, for displaying the total time of use of the band.

9. The apparatus of claim 7 wherein the electric circuit elements comprise:

an electrical conductor mounted continuously around the band and extending from the battery to the clock means; and the band- having first and second lockable ends, an electrical contact mounted in each of the first and second ends of the band and connected to the electrical conductor, the contacts being engageable, when the band is lockingly closed about a portion of a body of a person, to complete the electric circuit path through the electrical conductor between the battery and the clock means.

* * * * *